US012252341B2

(12) United States Patent
Liu et al.

(10) Patent No.: US 12,252,341 B2
(45) Date of Patent: Mar. 18, 2025

(54) GOODS SHELF SHUTTLE AND GOODS SHELF SYSTEM

(71) Applicant: BEIJING JINGDONG QIANSHI TECHNOLOGY CO., LTD., Beijing (CN)

(72) Inventors: Chen Liu, Beijing (CN); Fengquan Huang, Beijing (CN); Guoku Song, Beijing (CN); Mingfu Wu, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 651 days.

(21) Appl. No.: 17/606,693

(22) PCT Filed: Apr. 8, 2020

(86) PCT No.: PCT/CN2020/083689
§ 371 (c)(1),
(2) Date: Oct. 26, 2021

(87) PCT Pub. No.: WO2020/220949
PCT Pub. Date: Nov. 5, 2020

(65) Prior Publication Data
US 2022/0212868 A1     Jul. 7, 2022

(30) Foreign Application Priority Data

Apr. 30, 2019 (CN) .......................... 201910361595.6

(51) Int. Cl.
*B65G 1/04* (2006.01)
*B66C 19/00* (2006.01)

(52) U.S. Cl.
CPC ......... *B65G 1/0492* (2013.01); *B65G 1/0464* (2013.01); *B66C 19/00* (2013.01)

(58) Field of Classification Search
CPC ...... B65G 1/0492; B65G 1/0464; B66C 19/00
See application file for complete search history.

(56) References Cited

U.S. PATENT DOCUMENTS

| 6,113,336 A | 9/2000 | Chang |
| 2002/0102149 A1 | 8/2002 | Warhurst et al. |

(Continued)

FOREIGN PATENT DOCUMENTS

| CN | 102765573 A | 11/2012 |
| CN | 103950675 A | 7/2014 |

(Continued)

OTHER PUBLICATIONS

International Search Report dated Jul. 15, 2020 for International Patent Application No. PCT/CN2020/083689.

(Continued)

*Primary Examiner* — Saul Rodriguez
*Assistant Examiner* — Ashley K Romano

(57) ABSTRACT

A goods shelf shuttle and a goods shelf system, where the goods shelf shuttle includes a vehicle body (100), an access device (500), and a lifting device (600); an accommodating chamber for accommodating the access device (500) is formed inside the vehicle body (100); the access device (500) includes a fixed part (510) and a mobile part (520) for accessing goods (900); the mobile part (520) is capable of telescopically moving relative to the fixed part (510); the lifting device (600) is connected between the fixed part (510) and the vehicle body (100), and the lifting device (600) is configured to drive the fixed part (510) to move along a vertical direction, thereby enabling the access device (500) to extend from or retract into the accommodating chamber. The goods shelf shuttle and goods shelf system may access goods (900) on each layer of the goods shelf (700).

17 Claims, 6 Drawing Sheets

(56) References Cited

U.S. PATENT DOCUMENTS

| | | | |
|---|---|---|---|
| 2003/0185656 A1 | 10/2003 | Hansl | |
| 2011/0033270 A1 | 2/2011 | Toncelli | |
| 2017/0129702 A1 | 5/2017 | Ilognaland | |
| 2018/0022547 A1* | 1/2018 | Wehner | B65G 1/065 |
| | | | 414/279 |
| 2018/0305122 A1* | 10/2018 | Moulin | B65G 1/0492 |
| 2019/0031478 A1* | 1/2019 | Assmann | B66F 7/0616 |
| 2019/0084763 A1 | 3/2019 | Beer | |
| 2019/0352092 A1* | 11/2019 | Zheng | B65G 1/1375 |
| 2020/0115159 A1* | 4/2020 | Wu | B65G 1/1373 |
| 2020/0339349 A1* | 10/2020 | Frissenbichler | B65G 1/065 |
| 2021/0047118 A1* | 2/2021 | Stevens | B65G 1/0492 |
| 2021/0237971 A1* | 8/2021 | Zhang | B65G 1/0428 |
| 2021/0323767 A1* | 10/2021 | Liu | B65G 65/00 |
| 2021/0354966 A1* | 11/2021 | Kong | G05B 19/41895 |
| 2021/0395014 A1* | 12/2021 | Chen | B65G 1/0435 |

FOREIGN PATENT DOCUMENTS

| | | |
|---|---|---|
| CN | 203740965 U | 7/2014 |
| CN | 104071542 A | 10/2014 |
| CN | 204802487 U | 11/2015 |
| CN | 205257179 | 5/2016 |
| CN | 205312355 U | 6/2016 |
| CN | 105730956 A | 7/2016 |
| CN | 108408316 A | 8/2018 |
| CN | 210122322 U | 3/2020 |
| DE | 29818425 U1 | 1/1999 |
| GB | 1 432 224 A | 4/1976 |
| JP | S63-242809 A | 10/1988 |
| JP | H11-79321 A | 3/1999 |
| JP | 2000203703 A | 7/2000 |
| JP | 2011057357 A | 3/2011 |
| JP | 2016-529181 A | 9/2016 |
| JP | 2001341806 A | 12/2021 |
| WO | 2012/044734 A1 | 4/2012 |
| WO | 2015/193278 A1 | 12/2015 |

OTHER PUBLICATIONS

The Extended European Search Report for European Patent Application No. 20798019.4, dated Dec. 2, 2022.
The Notice of Reasons for Refusal for Japanese Patent Application No. 2021-564109, dated Jan. 5, 2023.
The Chinese Office Action dated Oct. 28, 2024 for Application No. 201910361595.6.

* cited by examiner

GOODS SHELF SHUTTLE AND GOODS SHELF SYSTEM

CROSS-REFERENCE TO RELATED APPLICATIONS

This application is a National Stage of International Application No. PCT/CN2020/083689, filed on Apr. 8, 2020, which claims priority to Chinese Patent Application No. 201910361595.6, filed on Apr. 30, 2019, both of the above applications are hereby incorporated by reference in their entireties.

TECHNICAL FIELD

The present application relates to the field of storage equipment, and in particular, to a goods shelf shuttle and goods shelf system.

BACKGROUND

With the rapid development of the logistics industry, the transportation and selection of goods and other items are important processes in the logistics industry. Shuttles are usually set up in the warehouse to store and retrieve goods regarding the issue of how to improve the accuracy and speed of goods transportation.

In the related art, a plurality of shelves are provided in the warehouse, and each shelf is provided with a plurality of laminates arranged at intervals along a vertical direction, and each laminate extends in a horizontal direction, a storage space for storing goods can be formed between two adjacent laminates. A shuttle is provided on one side of each floor, and the shuttle can move along the horizontal direction to take out the goods in the storage space, that is, one shuttle can take out the goods in one layer.

However, since each layer of the shelf needs to be equipped with a shuttle, the number of shuttles required is large, and the production cost is high.

SUMMARY

According to one aspect of this application, a goods shelf shuttle and a goods shelf system are provided to overcome the problem of high cost due to use of multiple shuttles in a warehouse in the related art.

The present application provides a goods shelf shuttle, including: a vehicle body, an access device and a lifting device, where an accommodating chamber for accommodating the access device is formed in the vehicle body; the access device includes a fixed part and a mobile part for accessing goods; the mobile part can telescopically move relative to the fixed part; the lifting device is connected between the fixed part and the vehicle body, the lifting device is configured to drive the fixed part to move along a vertical direction, thereby enabling the access device to extend from or retract into the accommodating chamber.

In an optional embodiment, the lifting device includes a lifting drive and a connecting member, the lifting drive is connected to the vehicle body, and a first end of the connecting member is connected to an output end of the lifting drive, a second end of the connecting member is connected to the fixed part, and the lifting drive is configured to drive the connecting member to move so as to vary a distance between the first end and the second end in a vertical direction.

In an optional embodiment, the lifting device further includes: a transmission rod rotatably connected to the vehicle body; the connecting member includes a plurality of flexible lifting belts wound on the transmission rod, one ends of the flexible lifting belts are fixed to the transmission rod, and the other ends of the flexible lifting belts are fixedly connected with the fixed part; and an output end of the lifting drive is connected with the transmission rod to drive the transmission rod to rotate, thereby changing a distance between the other end of the flexible lifting belt and the transmission rod.

In an optional embodiment, the vehicle body is further provided with a plurality of rollers arranged according to a preset rule, and the other end of each of the flexible lifting belts passes around one roller and is then fixedly connected to the fixed part.

In an optional embodiment, portions of the flexible lifting belts between the rollers and the fixed part extend in a vertical direction.

In an optional embodiment, the goods shelf shuttle includes a first walking device, and the first walking device is connected to the vehicle body and is configured to drive the vehicle body to move along a lateral direction.

In an optional embodiment, the first walking device includes: a first drive assembly and a plurality of first walking wheels arranged on the vehicle body in an array, an axle of the each first walking wheel extends in a longitudinal direction; the first drive assembly includes a first drive connected to the vehicle body and a first rotation shaft extending in the longitudinal direction. Both ends of the first rotation shaft are each fixed with two first walking wheels, the first rotation shaft is rotatably connected to the vehicle body; an output end of the first drive is connected with the first rotation shaft to drive the first rotation shaft to rotate. In an optional embodiment, the goods shelf shuttle further includes a second walking device and a telescopic device, the second walking device is connected to the vehicle body through the telescopic device, the telescopic device is configured to drive the second walking device to move in a vertical direction relative to the vehicle body, so that the second walking device contacts with or separates from a track; the second walking device is configured to drive the vehicle body to move in the longitudinal direction.

In an optional embodiment, the telescopic device includes: a telescopic drive, two telescopic plates that can be slidably arranged on the vehicle body along the vertical direction, and a connecting rod rotatably connected to the vehicle body; the two telescopic plates are respectively arranged on both sides of the vehicle body along the lateral direction; both ends of the connecting rod are each fixed with an eccentric wheel, and each telescopic plate is provided with an oblong hole for fitting with the eccentric wheel; the telescopic drive is connected with the connecting rod to drive the connecting rod to rotate; the second walking device is connected to the telescopic plate.

In an optional embodiment, the second walking device includes: a second drive assembly and a plurality of second walking wheels arranged symmetrically on the two telescopic plates, an axle of each second walking wheel extends in the lateral direction; the second drive assembly includes a second drive arranged on the telescopic plate, a second rotation shaft extending along the lateral direction, and two transmission assemblies respectively arranged at both ends of the second rotation shaft; both ends of the second rotation shaft are rotatably connected to the two telescopic plates, an end of each transmission assembly away from the second rotation shaft is connected to one second walking wheel; an output end of the second drive is connected to the second rotation shaft to drive the second rotation shaft to rotate.

In an optional embodiment, the fixed part includes a bottom plate and two side plates each arranged on the bottom plate; the side plates are connected with the lifting device; each side plate is connected to a first telescopic plate that is slidably arranged on the side plate in a longitudinal direction; the first telescopic plate is further provided with a second telescopic plate that is slidably arranged on the first telescopic plate in the longitudinal direction, two ends of the second telescopic plate are each provided with the mobile part; the mobile part can follow the first telescopic plate and the second telescopic plate to move longitudinally relative to the fixed part; and the mobile part can also rotate relative to the second telescopic plate so as to protrude inwards from the second telescopic plate; an access drive assembly is further provided on the fixed part; the access drive assembly is configured to drive the first telescopic plate to slide relative to the side plates, and drive the second telescopic plate to slide relative to the first telescopic plate.

In an optional embodiment, the access drive assembly includes: an access drive and a first access transmission assembly connected between the access drive and the first telescopic plate; the first access transmission assembly includes: a plurality of belt wheels and a toothed belt winding the plurality of belt wheels; the toothed belt includes a first section extending along the longitudinal direction; and a plurality of first teeth arranged at intervals along the longitudinal direction are formed on the first section; a plurality of second teeth arranged at intervals along the longitudinal direction are formed on the bottom surface of the first telescopic plate; the first teeth and the second teeth are fitted with each other; an output end of the access drive is connected with one belt wheel to drive the belt wheel to rotate, the first telescopic plate slides relative to the side plates.

In an optional embodiment, the access drive assembly further includes: a second access transmission assembly connected to the first telescopic plate and the second telescopic plate; the second access transmission assembly includes: two pulleys arranged at two ends of the first telescopic plate and two belts respectively winding the two pulleys; axes of the pulleys extend along the vertical direction, one ends of the belts are fixed to the side plates, the other ends of the belts are fixed to the second telescopic plate after passing around the pulleys, winding directions of the two belts on the corresponding pulleys are opposite.

In an optional embodiment, the fixed part is further provided with a supporting device; the supporting device includes a supporting drive assembly and a plurality of engaging parts connected with the supporting drive assembly; the supporting drive assembly is configured to drive the engaging part to move relative to the fixed part in a direction parallel to extension and retraction of the mobile part, so that the engaging part engages with engagement slot on a shelf.

In an optional embodiment, the supporting drive assembly includes a supporting drive and a supporting transmission assembly; the supporting transmission assembly includes a gear fixedly connected to an output end of the supporting drive, a sector gear matched with the gear, a first connecting rod, and two second connecting rods respectively hinged to both ends of the first connecting rod; the sector gear is fixed at middle of the first connecting rod; an end of each second connecting rod, away from the first connecting rod is hinged to the engaging part; the fixed part is provided with a sliding rail, the engaging part is slidably arranged on the sliding rail.

The present application also provides a goods shelf system, including a plurality of shelves arranged in an array, tracks arranged on tops of the shelves, and a goods shelf shuttle, the vehicle body of the goods shelf shuttle can travel on the tracks.

In the goods shelf shuttle and goods shelf system provided by the present application, there is provided a vehicle body, an access device and a lifting device; where an accommodating chamber for accommodating the access device is formed in the vehicle body; the access device includes a fixed part and a mobile part for accessing goods; the mobile part can telescopically move relative to the fixed part; the lifting device is connected between the fixed part and the vehicle body, the lifting device is configured to drive the fixed part to move along a vertical direction, thereby enabling the access device to extend from or retract into the accommodating chamber. Since the access device of the goods shelf shuttle can move in the vertical direction under the driving of the lifting device, the goods in each layer of the shelf can be accessed, thereby reducing the number of the goods shelf shuttle and lowering the production cost.

DESCRIPTION OF REFERENCE NUMERALS

| 100: Vehicle body; | 200: First walking device; |
|---|---|
| 210: First drive assembly; | 211: First drive; |
| 220: First walking wheel; | 300: Second walking device; |
| 310: Second drive assembly; | 311: Second drive; |
| 312: Second rotation shaft; | 313: Transmission assembly; |
| 320: Second walking wheel; | 400: Telescopic device; |
| 410: Telescopic drive; | 420: Telescopic plate; |
| 430: Connecting rod; | 431: Eccentric wheel; |
| 500: Access device; | 510: Fixed part; |
| 511: Bottom plate; | 512: Side plate; |
| 513: Access drive assembly; | 514: Access drive; |
| 515: Belt wheel; | 516: Toothed belt; |
| 517: Pulley; | 518: Belt; |
| 520: Mobile part; | 530: First Telescopic plate; |
| 540: Second telescopic plate; | 550: Supporting device; |
| 551: Engaging part; | 552: Gear; |
| 553: Sector gear; | 554: First connecting rod; |
| 555: Second connecting rod; | 556: Sliding rail; |
| 557: Supporting drive; | 560: Driving wheel |
| 570: Tensioning wheel | 580: Guide wheel; |
| 600: Lifting device | 610: Lifting drive; |
| 620: Transmission rod; | 630: Flexible lifting belt; |
| 640: Roller; | 700: Shelf; |
| 800: Track; | 900: Goods. |

DETAILED DESCRIPTION OF EMBODIMENTS

Figure 1:
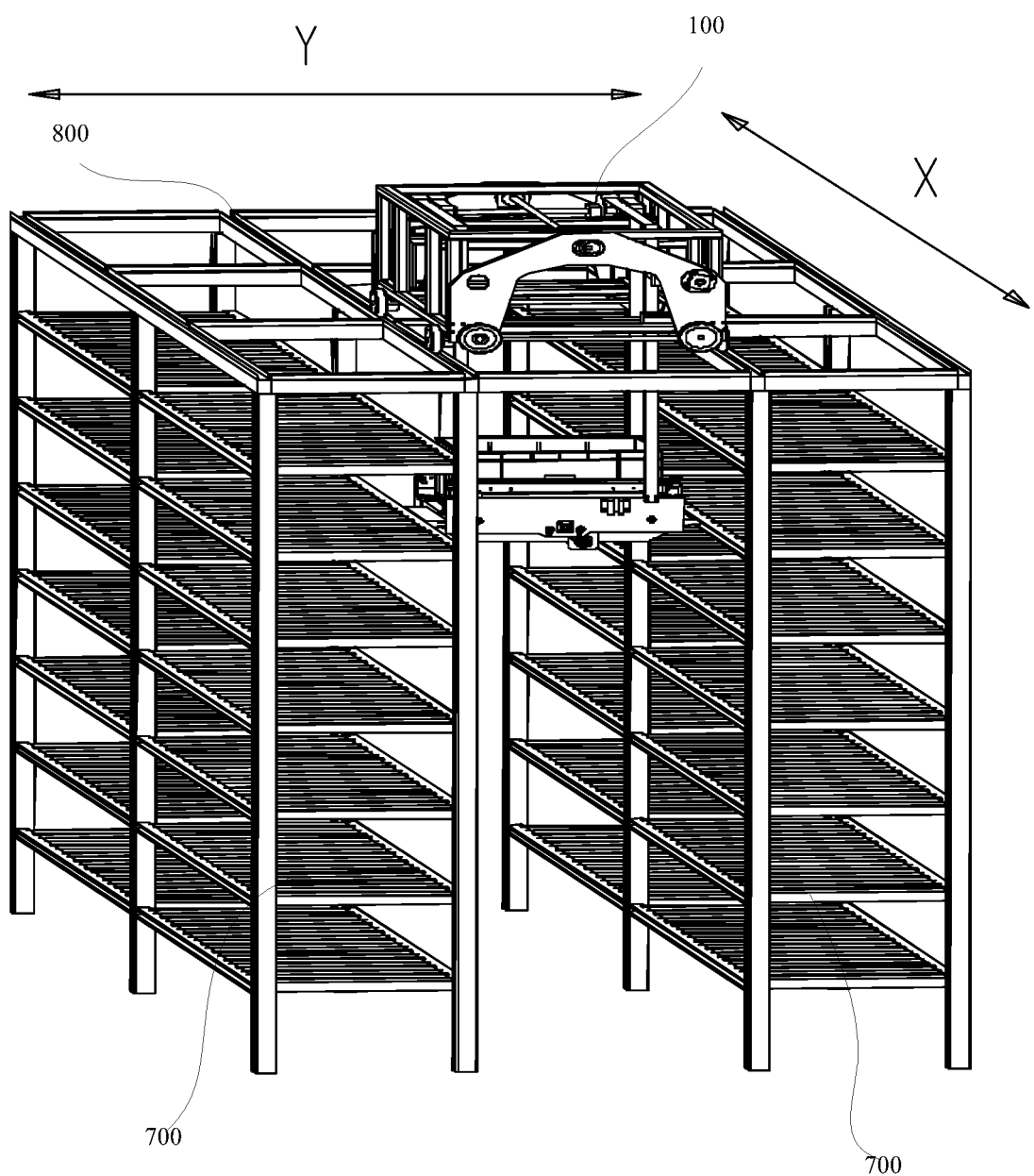
FIG. 1 is a schematic diagram of an overall structure of a goods shelf system in one or more embodiments of the present application.
Figure 2:
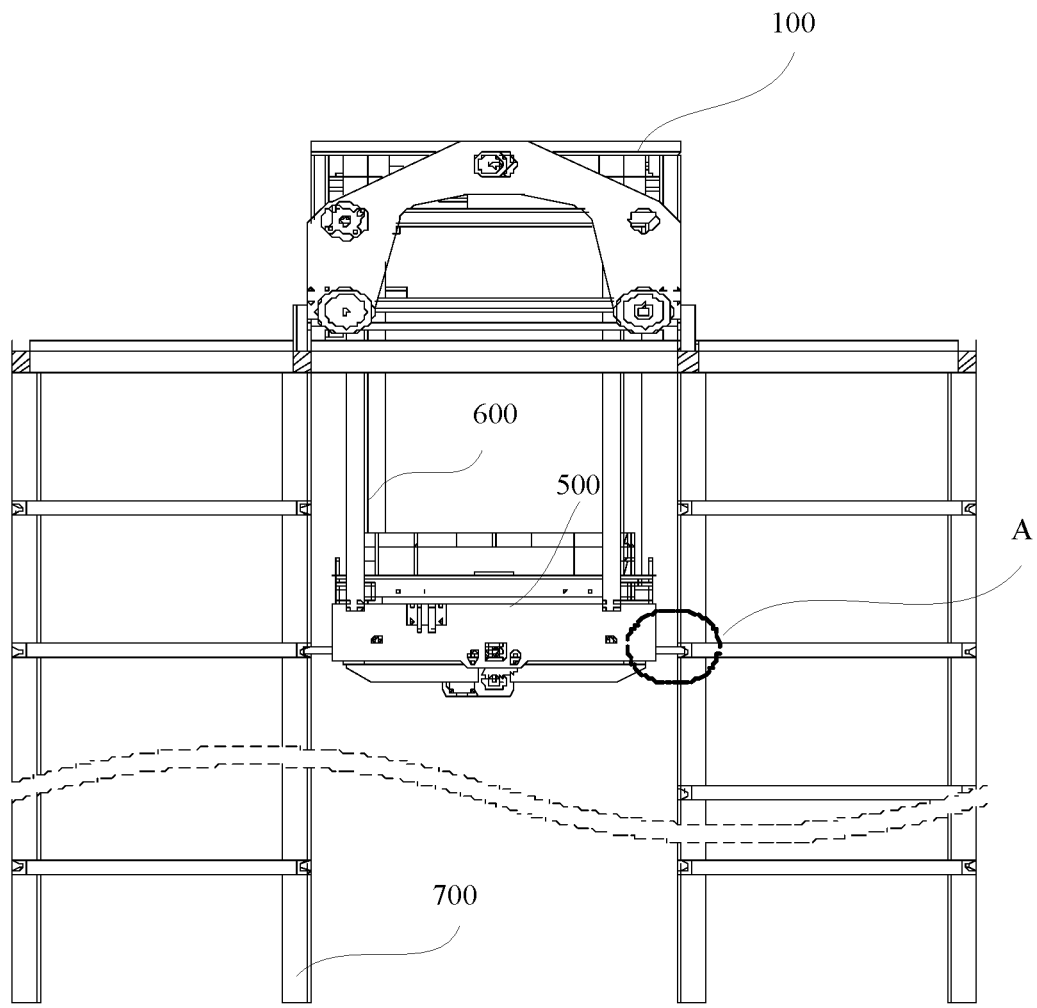
FIG. 2 is a front view of FIG. 1.
Figure 3:
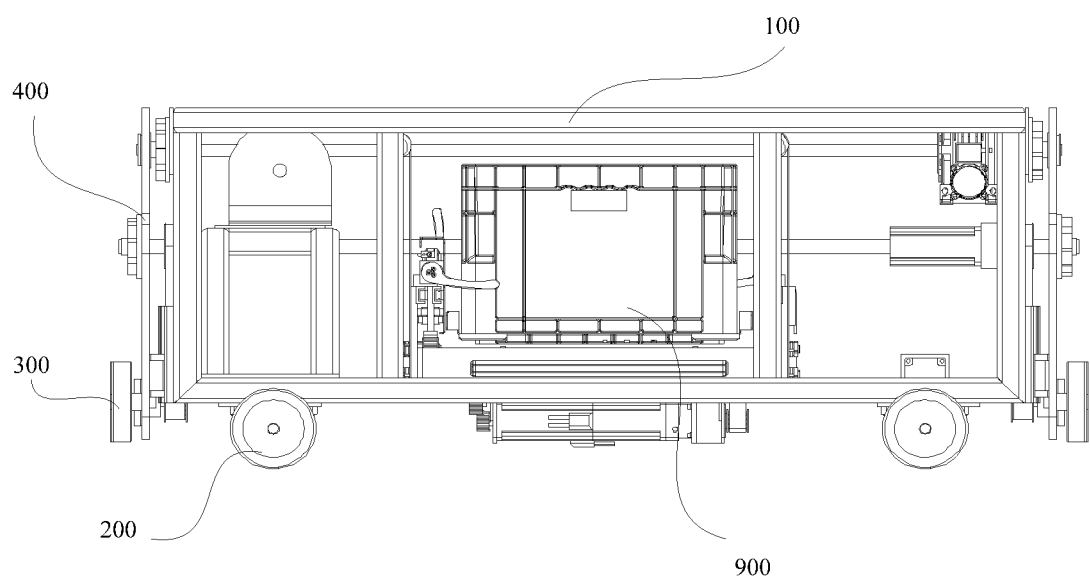
FIG. 3 is schematic diagram 1 of a goods shelf shuttle in one or more embodiments of the present application.
Figure 4:
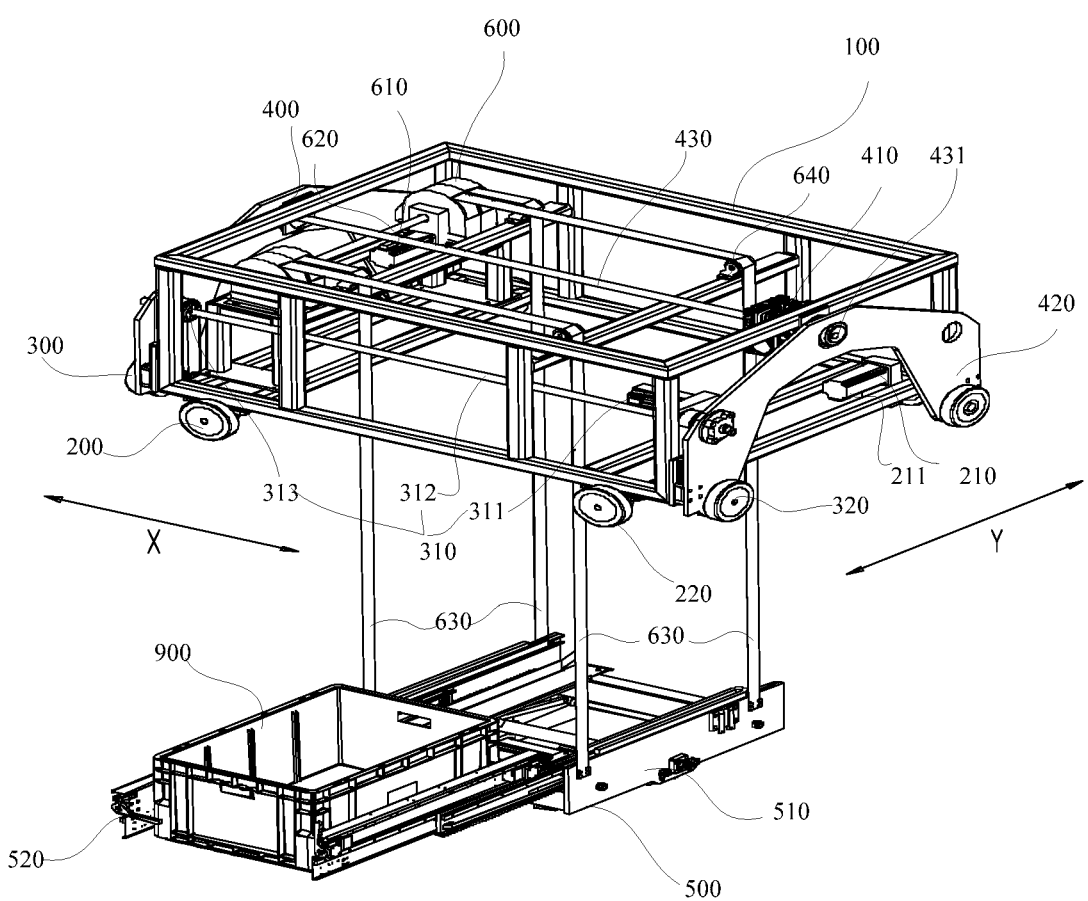
FIG. 4 is schematic diagram 2 of a goods shelf shuttle in one or more embodiments of the present application.

FIG. 1 is a schematic diagram of an overall structure of a goods shelf system in an embodiment of the present application; FIG. 2 is a front view of FIG. 1; FIG. 3 is schematic diagram 1 of a goods shelf shuttle in an embodiment of the present application; FIG. 4 is schematic diagram 2 of a goods shelf shuttle in an embodiment of the present application. In figures, X stands for lateral direction and Y stands for longitudinal direction. Vertical direction is a direction perpendicular to both the longitudinal direction and the lateral direction.

Please refer to FIG. 1 to FIG. 4. This embodiment provides a goods shelf shuttle, including: a vehicle body 100, an access device 500, and a lifting device 600; an accommodating chamber is formed inside the vehicle body 100 and is configured to accommodate the access device 500; the access device 500 includes a fixed part 510 and a mobile part 520 for accessing goods 900; the mobile part 520 can move telescopically relative to the fixed part 510; the lifting device 600 is connected between the fixed part 510 and the vehicle body 100, the lifting device 600 is configured to drive the fixed part 510 to move in a vertical direction, thereby enabling the access device 500 to extend from or retract into the accommodating chamber.

The goods shelf shuttle can be applied in warehousing logistics systems. The warehousing logistics systems generally include a warehouse; the warehouse is provided with a plurality of shelves 700 arranged in an array in lateral and longitudinal directions, and aisles are formed between the shelves 700; each shelf 700 is also formed with multiple storage spaces in layers, each storage space is provided with a plurality of goods 900 at intervals in a horizontal direction. The goods shelf shuttle can move in the aisles to store and fetch goods 900.

The goods shelf shuttle includes the vehicle body 100, and the vehicle body 100 can have a variety of structures. For example, the vehicle body 100 can be a box-like structure, or the vehicle body 100 can be a frame structure composed of multiple beams. The accommodating chamber may be formed in the vehicle body 100, and the size of the accommodating chamber may be larger than the size of the goods 900, so that the goods 900 can be contained in the accommodating chamber.

The access device 500 can be connected to the vehicle body 100 through the lifting device 600, and the access device 500 can move vertically relative to the vehicle body 100 by the lifting device 600, so that the access device 500 can be located in the accommodating chamber or extend out of the accommodating chamber. The access device 500 may include the fixed part 510 and the mobile part 520. The fixed part 510 may be a box-like structure or a net-like structure. The fixed part 510 may be connected with the lifting device 600 so as to move in the vertical direction under the action of the lifting device 600. The mobile part 520 can move in a horizontal direction relative to the fixed part 510, thereby transporting the goods 900 on the shelf 700 to the fixed part 510, or pushing the goods 900 on the fixed part 510 into the shelf 700. The mobile part 520 can have multiple structures, for example, the mobile part 520 can be a clamping arm that can clamp goods 900, and the clamping arm can extend and retract relative to the fixed part 510 in a lateral or longitudinal direction, so as to carry goods 900.

The lifting device 600 can also have various structures, for example, the lifting device 600 can include a motor and a wire rope wound on a rotation shaft of the motor. An end of the wire rope can be connected with a hook structure, the fixed part 510 can be hung on the hook structure, and the motor drives the wire rope to move in a vertical direction, thereby driving the access device 500 to move in the vertical direction.

When the goods shelf shuttle receives an instruction of taking out the goods 900 in a certain layer of the shelf 700, the goods shelf shuttle can use the lifting device 600 to lower the access device 500 to the layer where the goods 900 is located, and then transfer the goods 900 to the fixed part 510 through the mobile part 520, and then use the lifting device 600 to move the access device 500 and the goods 900 into the accommodating chamber, and then the goods shelf shuttle can be moved to a designated delivery position for unloading.

It can be understood that the process of storing goods 900 is opposite to the above process, and will not be described here. The goods shelf shuttle in the FIG. 1 is set on the top of the shelf 700, and the access device 500 can move downward to extend out of the accommodating chamber. However, in other embodiments, the goods shelf shuttle can be set on the ground, and at this time, the access device 500 can move upward to extend out of the accommodating chamber, there is no specific limitation here.

In the goods shelf shuttle provided in this embodiment, there is provided a vehicle body, an access device and a lifting device; where an accommodating chamber for accommodating the access device is formed in the vehicle body; the access device includes a fixed part and a mobile part for accessing goods; the mobile part can telescopically move relative to the fixed part; the lifting device is connected between the fixed part and the vehicle body, the lifting device is configured to drive the fixed part to move along a vertical direction, thereby enabling the access device to extend from or retract into the accommodating chamber. Since the access device of the goods shelf shuttle can move in the vertical direction under the driving of the lifting device, the goods in each layer of the shelf can be accessed, thereby reducing the number of the goods shelf shuttle and lowering the production cost.

As an optional embodiment of the lifting device 600, the lifting device 600 includes a lifting drive 610 and a connecting member, the lifting drive 610 is connected to the vehicle body 100, and a first end of the connecting member is connected to an output end of the lifting drive 610, a second end of the connecting member is connected to the fixed part 510, and the lifting drive 610 is configured to drive the connecting member to move so as to vary the distance between the first end and the second end in a vertical direction.

Among them, the lifting drive 610 can be an electric machine or a motor, the connecting member can be a telescopic connecting rod, the connecting rod can extend in a vertical direction, and the output end of the lifting drive 610 can be connected with the connecting rod, thereby changing the length of the connecting rod along the vertical direction, the end of the connecting rod can be connected with the fixed part 510 to drive the access device 500 to move in the vertical direction.

Optionally, the lifting device 600 further includes: a transmission rod 620 rotatably connected to the vehicle body 100; the connecting member includes a plurality of flexible lifting belts 630 wound on the transmission rod 620, one ends of the flexible lifting belts 630 are fixed on the transmission rod 620, and the other ends of the flexible lifting belts 630 are fixedly connected with the fixed part 510; an output end of the lifting drive 610 is connected with the transmission rod 620 to drive the transmission rod 620 to rotate, thereby changing the distance between the other end of the flexible lifting belt 630 and the transmission rod 620.

Where the lifting drive 610 may include a motor and a reducer connected to the motor, and the reducer is connected to the transmission rod 620. The access device 500 may move up and down by the flexible lifting belt 630. The transmission rod 620 can be rotated relative to the vehicle body 100 under the driving of the lifting drive 610, the transmission rod 620 can extend in the longitudinal direction, the transmission rod 620 is wound with a plurality of flexible lifting belts 630, the flexible lifting belts 630 can change the distance between its bottom end and the transmission rod 620 under the rotation of the transmission rod 620, the flexible lifting belts 630 can be fixed to the fixed part 510, so as to realize the lifting of the fixed part 510.

Optionally, the vehicle body 100 is further provided with a plurality of rollers 640 arranged according to a preset rule, and the other end of each flexible lifting belt 630 passes around one roller 640 and is then fixedly connected to the fixed part 510.

Among them, all the rollers 640 can play a guiding role, and the plurality of rollers 640 can be arranged according to the preset rule, for example, they can be arranged at intervals in a circumferential direction, or they can be arranged in a matrix direction, which can be specifically set according to the size and shape of the fixed part 510. Each flexible lifting belt 630 is connected to the fixed part 510 after passing around a roller 640. The rollers 640 can change the positions of the extension ends of the flexible lifting belts 630, so that the extension ends of the flexible lifting belts 630 can be evenly fixed around the fixed part 510, thereby smoothly lift the fixed part 510. In the embodiment of FIG. 4, the number of the flexible lifting belts 630 is 4, both ends of the transmission rod 620 are each connected with two flexible lifting belts 630, the cross section of the fixing part can be quadrilateral, and four flexible lifting belts 630 can be evenly fixed around the fixing part.

Further, the portions of the flexible lifting belts 630 located between the rollers 640 and the fixed part 510 extend in the vertical direction, so that the fixed part 510 only receives a vertical pulling force when moving up and down, receiving no horizontal force component, which avoids the swing of the access device 500.

On the basis of the above embodiment, the goods shelf shuttle includes a first walking device 200, the first walking device 200 is connected to the vehicle body 100 and is configured to drive the vehicle body 100 to move along a lateral direction.

Among them, in order to facilitate the vehicle body 100 to walk in the aisle, the first walking device 200 is provided on the vehicle body 100. A lateral track may be provided between two adjacent shelves 700. The first walking device 200 can drive the vehicle body 100 to walk on the lateral track, the first walking device 200 can have a variety of structures, for example, it can be equipped with motor and a crawler wheel, the motor can drive the crawler wheel to rotate, thereby driving the vehicle body 100 to walk along the lateral track.

Optionally, the first walking device 200 includes: a first drive assembly 210 and a plurality of first walking wheels 220 arranged in an array on the vehicle body 100, the axle of each first walking wheel 220 extends in the longitudinal direction; the first drive assembly 210 includes a first drive 211 connected to the vehicle body 100 and a first rotation shaft extending in the longitudinal direction, both ends of the first rotation shaft are each fixed with two first walking wheels 220, the first rotation shaft is rotatably connected to the vehicle body 100; an output end of the first drive 211 is connected to the first rotation shaft so as to drive the first rotation shaft to rotate.

Among them, FIG. 4 can be referred to, in which four first walking wheels 220 are shown, the four first walking wheels 220 are distributed in a rectangular shape, that is, two first walking wheels 220 are arranged at a longitudinal interval, and the other two first walking wheels 220 are arranged at a lateral interval. Each first walking wheel 220 can be rotatably connected to the vehicle body 100, the axle of each first walking wheel 220 extends in the longitudinal direction, so that the first walking wheel can drive the vehicle body 100 to move in the lateral direction. Among them, one first rotation shaft (not shown) may be arranged between the two first walking wheels 220 arranged at the longitudinal interval, the first drive 211 may include a motor and a reducer connected to the motor, an output end of the reducer may be connected to the first rotation shaft so as to drive the first rotation shaft to rotate, and thus drive the first walking wheels 220 to roll, so that the goods shelf shuttle can use two lateral tracks to move and run more smoothly.

It can be understood that, in this embodiment, the first drive 211 only drives the two first walking wheels 220 at both ends of the first rotation shaft, and the remaining two first walking wheels 220 can be passively rolled, which reduces the cost. In other embodiments, one first rotation shaft may be provided between every two first walking wheels 220, and multiple first rotation shafts may be simultaneously driven by the first drive 211. In addition, the number of the first walking wheels 220 can also be 6, 8, etc., and is not limited here.

On the basis of the above embodiment, the goods shelf shuttle further includes a second walking device 300 and a telescopic device 400, the second walking device 300 is connected to the vehicle body 100 through the telescopic device 400, the telescopic device 400 is configured to drive the second walking device 300 to move along the vertical direction relative to the vehicle body 100, so that the second walking device 300 can contact with or separate from a track 800; the second walking device 300 is configured to drive the vehicle body 100 to move along the longitudinal direction.

Among them, a warehouse may be provided with tracks 800 for travelling among the shelves 700, and the tracks 800 may include a plurality of lateral and longitudinal tracks that are staggered horizontally and laterally. The second walking device 300 can drive the vehicle body 100 to walk in the longitudinal direction, the second walking device 300 can have a variety of structures, for example, it can be equipped with a motor and a crawler wheel, where the motor can drive the crawler wheel to rotate, thereby driving the vehicle body 100 to walk along the longitudinal tracks.

It can be understood that in order to prevent the first walking device 200 and the second walking device 300 from being in contact with the track 800 at the same time and affecting the vehicle body 100 to move, the second walking device 300 and the vehicle body 100 can be connected through the telescopic device 400. The telescopic device 400 can drive the second walking device 300 to move in the vertical direction relative to the vehicle body 100, so as to contact with or separate from the longitudinal tracks, and when the second walking device 300 is in contact with the track 800, the first walking device 200 is separated from the track 800, and the vehicle body 100 is driven to move in the longitudinal direction, and when the second walking device 300 is separated from the track 800, the first walking device 200 is in contact with the track 800, and the vehicle body 100 is driven to move in the lateral direction.

When the moving of the vehicle body 100 is switched from the first walking device 200 to the second walking device 300, the telescopic device 400 drives the second walking device 300 to move downwards, and when the second walking device 300 contacts the track 800, the telescopic device 400 can continue to act, and at this time, the vehicle body 100 moves upwards, thereby driving the first walking device 200 to leave the track 800, realizing the switching between the lateral direction and the longitudinal direction.

The telescopic device 400 can have multiple structures, for example, the telescopic device 400 can include a linear motor and a slide way set on the vehicle body 100, the slide way can extend in the vertical direction, the second walking device 300 can be provided with sliding block, the linear motor can be located on the vehicle body 100, and its output can be connected to the sliding block, so that the sliding block can be driven to move along the slide way set along the vertical direction.

When the goods shelf shuttle receives an instruction of taking out a certain piece of goods 900, the goods shelf shuttle can laterally move by the first walking device 200 and longitudinally move by the second walking device 300 and thus dock in the aisle of the shelf 700 where the piece of goods 900 is located, and then the access device 500 is lowered by the lifting device 600 to reach the layer where the piece of goods 900 is located, and then the piece of goods 900 is transferred to the fixed part 510 through the mobile part 520, and then the access device 500 and the piece of goods 900 are moved by the lifting device 600 into the accommodating chamber, and then the goods shelf shuttle can be moved on the track to a designated delivery position for unloading.

The goods shelf shuttle provided in this embodiment can shuttle between multiple shelves in a warehouse and take out the goods on each layer of the shelf, and only one goods shelf shuttle provided in one warehouse can realize the storage and retrieval of all goods, which is low-cost.

As an optional embodiment of the telescopic device 400, the telescopic device 400 may include: a telescopic drive 410, two telescopic plates 420 that can be slidably arranged on the vehicle body 100 along the vertical direction, and a connecting rod 430 rotatably connected to the vehicle body 100; the two telescopic plates 420 are respectively provided on both sides of the vehicle body 100 along the lateral direction; both ends of the connecting rod 430 are each fixed with an eccentric wheel 431, and each telescopic plate 420 is provided with an oblong hole for matching with the eccentric wheel 431; the telescopic drive 410 is connected with the connecting rod 430 to drive the connecting rod 430 to rotate; the second walking device 300 is connected to the telescopic plate 420.

Where the telescopic device 400 may include the connecting rod 430 extending in the lateral direction, the connecting rod 430 is rotatably connected to the vehicle body 100; both ends of the connecting rod 430 may be connected with the telescopic plate 420, the telescopic plate 420 may include two telescopic arms, and the top ends of the two telescopic arms are connected, the bottom ends of the two telescopic arms can be extended obliquely downward, so that there is a preset angle between the two telescopic arms. The top ends of the telescopic arms can be provided with an oblong hole, the end of the connecting rod 430 can be provided with the eccentric wheel 431, the wheel surface of the eccentric wheel 431 can contact the inner surface of the oblong hole, the telescopic drive 410 can be an electric machine or a motor to drive the connecting rod 430 to rotate, and thus drive the eccentric wheel 431 to rotate, and the cooperation of the eccentric wheel 431 and the oblong hole enable the telescopic plate 420 to slide relative to the vehicle body 100 in the vertical direction. Optionally, a sliding groove may be provided on the vehicle body, and the inner surface of bottom of each telescopic arm facing the vehicle body 100 may be provided with a sliding block slidably disposed on the sliding groove, so as to realize the vertical movement of the two telescopic plates 420, with the structure being simple, and easy to accomplish. The second walking device 300 can be provided at the bottom end of the telescopic arm, thereby easier to access the track 800 and reducing the movement distance of the telescopic plate 420.

As a preferred embodiment of the second walking device 300, the second walking device 300 includes: a second drive assembly 310 and a plurality of second walking wheels 320 symmetrically distributed on the two telescopic plates 420, and the axle of each second walking wheel 320 extends in the lateral direction; the second drive assembly 310 includes a second drive 311 arranged on the telescopic plate 420, a second rotation shaft 312 extending along the lateral direction and two transmission assemblies 313 respectively arranged at both ends of the second rotation shaft 312; the both ends of the second rotation shaft 312 are rotatably connected to the two telescopic plates 420, one end of each transmission assembly 313 away from the second rotation shaft 312 is connected with one second walking wheel 320; an output end of the second drive 311 is connected with the second rotation shaft 312 to drive the second rotation shaft 312 to rotate.

Among them, please refer to FIG. 4, which shows four second walking wheels 320, the four second walking wheels 320 are distributed in a rectangular shape, that is, two second walking wheels 320 are arranged at a longitudinal interval, and the other two second walking wheels 320 are arranged at a lateral interval. The four second walking wheels 320 can be distributed at the bottom end of the telescopic arm. Each second walking wheel 320 can be rotatably connected to the vehicle body 100, the axle of each second walking wheel 320 extends laterally, so that the second walking wheel 320 can drive the vehicle body 100 to move in the longitudinal direction. Among them, the two second walking wheels 320 arranged at the lateral interval can be connected by the second rotation shaft 312 and the two transmission assemblies 313, two ends of the second rotation shaft 312 are rotatably connected to the two telescopic plates 420, the transmission assembly 313 can include a first belt wheel connected to one end of the second rotation shaft 312, a second belt wheel connected to the axle of the second walking wheel 320, and a synchronous belt sleeved outside the first belt wheel and the second belt wheel, the transmission assembly 313 can enable the axle of the second rotation shaft 312 and the axle of the second walking wheel 320 to have a vertical interval therebetween, so as to prevent the second rotation shaft 312 from interfering with the first rotation shaft when following the movement of the telescopic plate 420 in the vertical direction. Of course, the transmission assembly 313 can also be a gear transmission assembly, and has no limitation here.

The second drive 311 can include a motor connected to the telescopic plate 420 and a reducer connected to the motor. An output end of the reducer can be connected to the second rotation shaft 312 so as to drive the second rotation shaft 312 to rotate, thereby driving the transmission assembly 313 to operate and the second walking wheel 320 to roll, so that the goods shelf shuttle can use two longitudinal tracks to move, running more smoothly.

It can be understood that, in this embodiment, the second drive 311 only drives two second walking wheels 320 at both ends of the second rotation shaft, and the remaining two second walking wheels 320 can be passively rolled, which reduces the cost. In other embodiments, one second rotation shaft 312 and one transmission assembly 313 may be provided between every two second walking wheels 320, multiple second rotation shafts 312 may be simultaneously driven by the second drive 311. In addition, the number of the second walking wheels 320 can also be 6, 8, etc., and has no limitation here.

Figure 5:
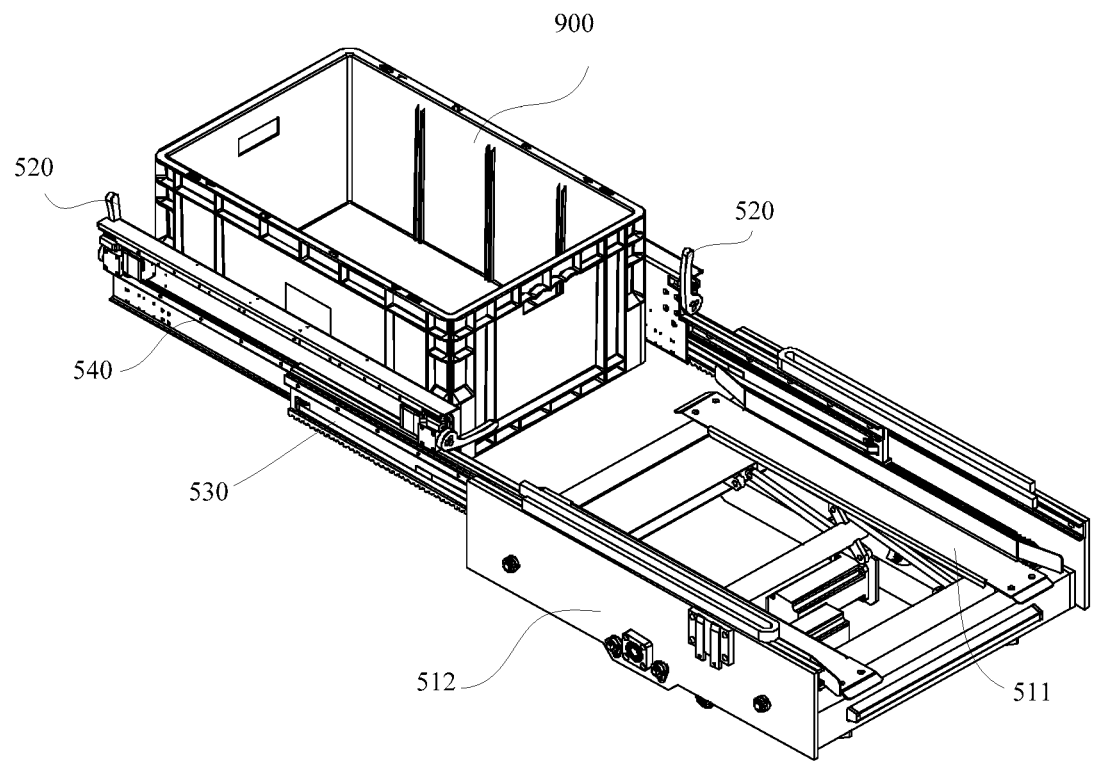
FIG. 5 is a schematic structural diagram of an access device in FIG. 4.
Figure 6:
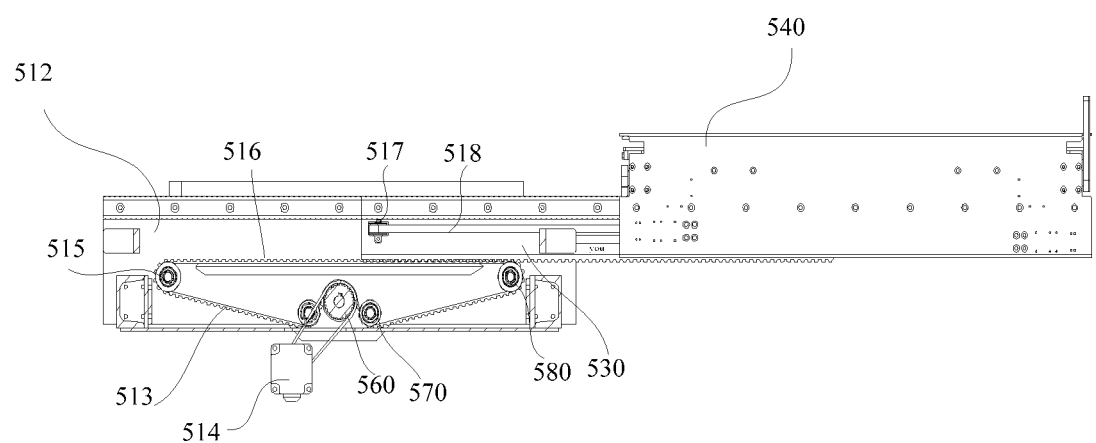
FIG. 6 is a back view of FIG. 5.

FIG. 5 is a structure diagram of the access device in FIG. 4; FIG. 6 is a back view of FIG. 5. Please combine FIG. 5 and FIG. 6 as an optional implementation of the access device 500, the fixed part 510 includes a bottom plate 511 and two side plates 512 respectively arranged on the bottom plate 511; the side plates 512 are connected with the lifting device 600; each side plate 512 is provided with a first telescopic plate 530 slidably disposed to the side plate 512 along the longitudinal direction; the first telescopic plate 530 is further provided with a second telescopic plate 540 slidably disposed to the first telescopic plate 530 in the longitudinal direction, two ends of the second telescopic plate 540 are respectively provided with the mobile part 520; the mobile part 520 can follow the first telescopic plate 530 and the second telescopic plate 540 to move in the longitudinal direction relative to the fixed part 510; and the mobile part 520 can also rotate relative to the second telescopic plate 540 so as to protrude inward from the second telescopic plate 540; the fixed part 510 is further provided with an access drive assembly 513; the access drive assembly 513 is configured to drive the first telescopic plate 530 to slide relative to the side plate 512, and to drive the second telescopic plate 540 to slide relative to the first telescopic plate 530.

Among them, the mobile part 520 of the access device 500 can extend from both ends of the fixed part 510 in the longitudinal direction, so as to take out goods 900 from two longitudinally adjacent shelves 700. The mobile part 520 can extend and retract by the first telescopic plate 530 and the second telescopic plate 540, the first telescopic plate 530 can be connected to the side plate 512, the first telescopic plate 530 can slide relative to the side plate 512 through a mechanism such as a sliding rail or a sliding groove, and the second telescopic plate 540 can also extend relative to the first telescopic plate 530 by a mechanisms such as a sliding rail or a sliding groove, thereby increasing the extension distance of the mobile part 520.

The number of the mobile part 520 may be four, and the four mobile parts 520 may be respectively arranged at the longitudinal two ends of the two second telescopic plates 540. The mobile parts 520 can be a rod-shaped structure, one end of the mobile part 520 can be rotatably connected to the second telescopic plate 540, the rotation axis of the mobile part 520 can be parallel to the telescopic direction, that is, the longitudinal direction, of the mobile part 520, and when the mobile part 520 rotates, the other end thereof can extend inwardly from the inner surface of the second telescopic plate 540.

When goods 900 needs to be transported to the fixed part 510, the first telescopic plate 530 and the second telescopic plate 540 can be extended so that the mobile part 520 at the front end of the second telescopic plate 540 in the telescopic direction is located behind the goods 900, and then two mobile parts 520 at the front end are rotated, so that the two mobile parts 520 protrude out of the second telescopic plate 540, and then the first telescopic plate 530 and the second telescopic plate 540 are retracted, and at this time, the mobile parts 520 can pull the goods 900 toward the fixed part 510 from the back of the goods 900. In this process, two mobile parts 520 located at the back do not operate, and when goods 900 in the fixed part 510 needs to be pushed into the shelf 700, these two mobile parts 520 can operate, thereby achieving storage and retrieval of goods 900.

The access drive assembly 513 may include two drive parts respectively driving the first telescopic plate 530 and the second telescopic plate 540. Optionally, the access drive assembly 513 includes: an access drive 514 and a first access transmission assembly connected between the access drive 514 and the first telescopic plate 530; the first access transmission assembly includes: a plurality of belt wheels 515 and a toothed belt 516 winding the plurality of belt wheels 515; the toothed belt 516 includes a first section extending in the longitudinal direction; and the first section is formed with a plurality of first teeth at intervals in the longitudinal direction; a plurality of second teeth are arranged at intervals in the longitudinal direction on the bottom surface of the first telescopic plate 530; the first teeth are matched with the second teeth; an output end of the access drive 514 is connected with one belt wheel 515 so as to drive the belt wheel 515 to rotate, and the first telescopic plate 530 slides relative to the side plate 512.

Among them, each side plate 512 can be provided with the first access transmission assembly, as shown in FIG. 6, the first access transmission assembly can include multiple belt wheels 515 and a toothed belt 516 sleeved outside the multiple belt wheels 515, the multiple belt wheels 515 may include a driving wheel 560 connected to the access drive 514 through a synchronizing belt, tensioning wheels 570 arranged on both sides of the driving wheel 560, and two guide wheels 580 located above the driving wheel 560, the two guide wheels 580 are located on the same horizontal plane, so that the first section between the two guide wheels 580 extends in the longitudinal direction.

The bottom surface of the first telescopic plate 530 and the top surface of the first section may be formed with a gear meshing mechanism, so as to realize the extension and retraction of the first telescopic plate 530, improving the reliability of transmission.

Further, the access drive assembly also includes: a second access transmission assembly connected with the first telescopic plate 530 and the second telescopic plate 540; the second access transmission assembly includes: two pulleys 517 arranged at two ends of the first telescopic plate 530 and two belts 518 respectively winding the two pulleys 517; axes of the pulleys 517 extend along the vertical direction, one end of the belt 518 is fixed on the side plate 512, the other end of the belt 518 is fixed on the second telescopic plates 540 after passing around the pulleys 517, and winding directions of the two belts 518 on the corresponding pulleys 517 are opposite.

Where two ends of the first telescopic plate 530 may be each provided with one pulley 517, the axis of the pulley 517 extends in the vertical direction, and one end of the belt 518 is fixed on the side plate 512 outside the first telescopic plate 530 to form a fixed end. The other end of the belt 518 can be fixed on the second telescopic plate 540 inside the first telescopic plate 530 after passing around the pulley 517. The winding directions of the belts on the two pulleys 517 are opposite. Refer to FIG. 6, one belt 518 is wound on the pulley 517 at the left end of the first telescopic plate 530, the fixed end of this belt 518 is fixed on the side plate 512, and the other end of this belt 518 approaches the pulley 517 from right to left, and extends from left to right after passing around the pulley 517, and is fixed on the second telescopic plate 530. As for the pulley 517 (not shown) on the right side of the first telescopic plate 530, one belt 518 is wound around this pulley 517, the fixed end of the belt 518 is fixed on the side plate 512, and the other end thereof approaches the pulley 517 from left to right, and extends from right to left after passing around the pulley 517, and is fixed on the second telescopic plate 540. When the pulley 517 and the first telescopic plate 530 move together, each pulley 517 and the corresponding belt 518 can form a set of movable pulley structure, so that the second telescopic plate 540 can move at a speed twice the speed of the first telescopic plate 530, improving access efficiency.

Two sets of movable pulley structures can be used in the movement of the mobile part 520 along the left and right directions of FIG. 6 respectively, so as to improve the efficiency of the mobile part 520 to extend and retract at both sides.

Figure 7:
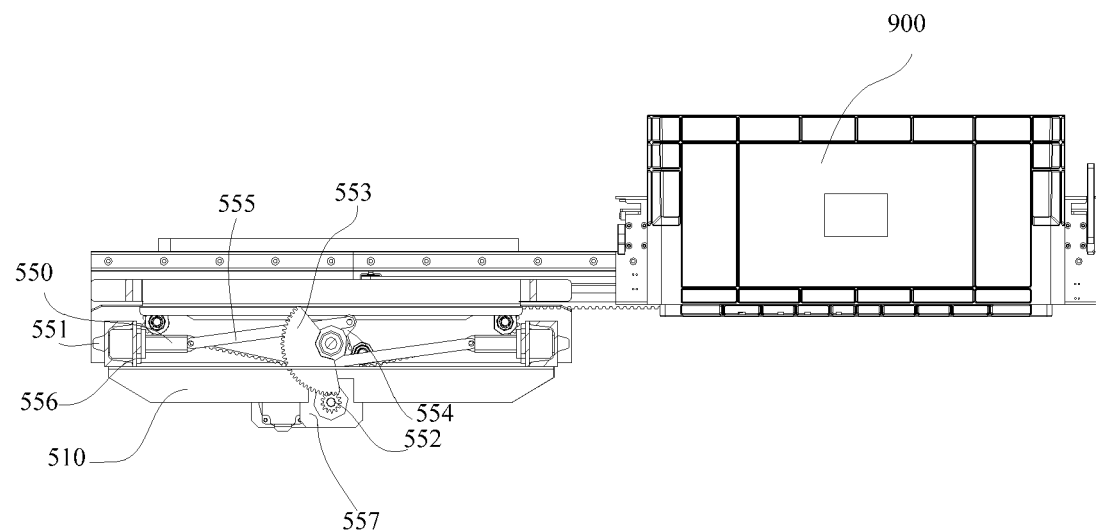
FIG. 7 is a schematic structural diagram of a supporting device in FIG. 5.
Figure 8:
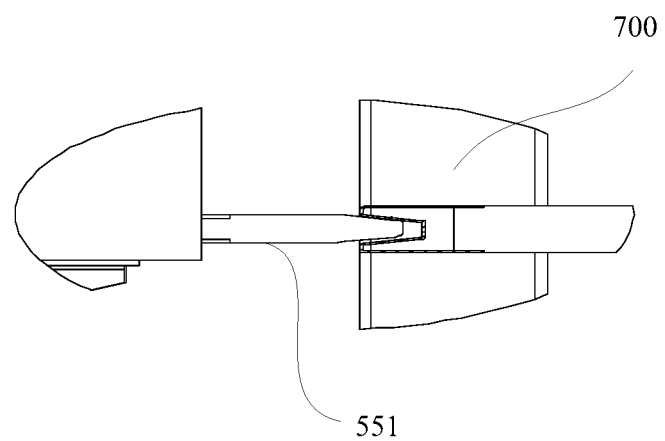
FIG. 8 is a partial magnification of position Ain FIG. 2.

On the basis of the above-mentioned embodiment, FIG. 7 is a schematic structural diagram of the supporting device in FIG. 5; FIG. 8 is a partial magnification of position A in FIG. 2. Please combine FIG. 7 and FIG. 8, optionally, the fixed part 510 is further provided with a supporting device 550; the supporting device 550 includes a supporting drive assembly and a plurality of engaging parts 551 connected to the supporting drive assembly; the supporting drive assembly is configured to drive the engaging parts 551 to move relative to the fixed part 510 along a direction parallel to extension and retraction of the mobile part 520, so that the engaging parts 551 are engaged with engagement slots on the shelf 700.

Where shelves 700 on both sides of each piece of goods 900 can be provided with engagement slots, and the engagement slots on two adjacent shelves 700 are symmetrical with respect to the center line of the aisle, and when the fixed part 510 descends to the position where goods 900 are located, the engaging part 551 can be engaged with the engagement slot around the fixed part 510 to support the access device 500 and avoid the fixed part 510 from shaking when the goods 900 or the mobile part 520 extends out, moving stably. In this embodiment, each engaging part 551 can be driven by a linear motor.

With reference to FIG. 7, in another embodiment, the supporting drive assembly may include a supporting drive 557 and a supporting transmission assembly; the supporting transmission assembly includes: a gear 552 fixedly connected to the output end of the supporting drive 557, a sector gear 553 and a first connecting rod 554 matched with the gear 552, and two second connecting rods 555 respectively hinged to both ends of the first connecting rod 554; the sector gear 553 is fixed in the middle of the first connecting rod 554; one end of each second connecting rod 555 away from the first connecting rod 554 is hinged to the engaging part 551; a sliding rail 556 is provided on the fixed part 510, and the engaging part 551 is slidably arranged on the sliding rail 556.

Where each side plate 512 is formed with one supporting transmission assembly, and the sector gear 553 can be fixed at the middle position of the first connecting rod 554 along the length direction. When the supporting drive 557 rotates, the sector gear 553 can be driven to rotate, thereby driving the second connecting rod 555 to move, the sliding rail 556 can enable the engaging part 551 to be driven to move in the longitudinal direction so as to achieve engagement. At the same time, in this embodiment, the fixing effect is good and the stability of movement is high, due to connection of four engaging parts 551.

Please refer to FIG. 1 and FIG. 2, this embodiment provides a goods shelf system, including a plurality of shelves 700 arranged in an array, tracks 800 arranged on the tops of the shelves 700 and a goods shelf shuttle, vehicle body 100 of the goods shelf shuttle can travel on the tracks 800.

Among them, the goods shelf system can be applied in a warehouse. The warehouse is provided with a plurality of shelves 700 arranged in a lateral and longitudinal array, aisles are formed between the shelves 700; each shelf 700 is formed with multiple layers of storage spaces, a plurality of goods 900 may be arranged inside each storage space. The top of the shelf 700 can be provided with the track 800, the vehicle body 100 of the goods shelf shuttle can move on the tracks 800, so as to move in the warehouse, and store and retrieve goods 900.

Optionally, the tracks 800 can include lateral tracks and longitudinal tracks, setting the tracks on the top of the shelf 700 can make rational use of the space on the top of the shelf 700, improving space utilization thereof. The goods shelf shuttle can move in the lateral direction by the first walking device 200 and move in the longitudinal direction by the second walking device 300, thereby docking in the aisle of the shelf 700 where goods 900 are located.

When the goods shelf shuttle receives the instruction of taking out goods 900 in a certain layer of the shelf 700, the goods shelf shuttle can lower the access device 500 by the lifting device 600 to the layer where the goods 900 are located, and then transfer the goods 900 to the fixed part 510 through the mobile part 520, and then move the access device 500 and the goods 900 into the accommodating chamber by the lifting device 600, and then the goods shelf shuttle can be moved to the designated delivery position for unloading.

In the goods shelf system provided by this embodiment, there is provided a vehicle body, an access device and a lifting device; where an accommodating chamber for accommodating the access device is formed in the vehicle body; the access device includes a fixed part and a mobile part for accessing goods; the mobile part can telescopically move relative to the fixed part; the lifting device is connected between the fixed part and the vehicle body, the lifting device is configured to drive the fixed part to move along a vertical direction, thereby enabling the access device to extend from or retract into the accommodating chamber. Since the access device of the goods shelf shuttle can move in the vertical direction under the driving of the lifting device, the goods in each layer of the shelf can be accessed, thereby reducing the number of the goods shelf shuttle and lowering the production cost.

In the present application, unless otherwise clearly specified and limited, the terms "install", "couple", "connect", "fix" and other terms should be interpreted broadly. For example, it can be a fixed connection or a detachable connection, or integrally formed; it can be direct connection or indirect connection through an intermediary, unless specifically defined otherwise. For those of ordinary skill in the art, the specific meaning of the above terms in the present application can be understood according to the specific situation.

In the above description, the description with reference to the terms "an embodiment", "some embodiments", "example", "specific example", or "some examples" etc. means specific features or characteristics described in conjunction with the embodiment or example are included in at least one embodiment or example of the present application. In this specification, the schematic expressions of the above terms do not necessarily refer to the same embodiment or example. Moreover, the specific features or characteristics described can be combined in any one or more of the embodiments or examples in an appropriate manner. In addition, those skilled in the art can integrate and combine different embodiments or examples and the features of different embodiments or examples described in this specification without contradicting each other.

Finally, it should be noted that: the above embodiments are only used to illustrate the technical solutions of the present application, but not to limit the present application; although the present application is described in detail with reference to the foregoing embodiments, those of ordinary skill in the art should understand that: the technical solutions described in the foregoing embodiments may be modified, or some or all of the technical features therein can be equivalently replaced; these modifications or replacements do not make the essence of the corresponding technical solutions deviate from the scope of the technical solutions of the embodiments of the present application.

The invention claimed is:

1. A goods shelf shuttle, comprising: a vehicle body, an access device and a lifting device;
    wherein an accommodating chamber for accommodating the access device is formed in the vehicle body; the access device comprises a fixed part and a mobile part for accessing goods; the mobile part is capable of telescopically moving relative to the fixed part; the lifting device is connected between the fixed part and the vehicle body, the lifting device is configured to drive the fixed part to move along a vertical direction, thereby enabling the access device to extend from or retract into the accommodating chamber;
    wherein the goods shelf shuttle further comprises a longitudinally movable walking device and a telescopic device, the longitudinally movable walking device is connected to the vehicle body through the telescopic device, the telescopic device is configured to drive the longitudinally movable walking device to move along a vertical direction relative to the vehicle body, so that the longitudinally movable walking device is in contact with or separated from a track; and the longitudinally movable walking device is configured to drive the vehicle body to move along a longitudinal direction;
    wherein the telescopic device comprises: a telescopic drive, two telescopic plates capable of being slidably arranged on the vehicle body along the vertical direction, and a connecting rod rotatably connected to the vehicle body; the two telescopic plates are respectively arranged on both sides of the vehicle body along the lateral direction;
    both ends of the connecting rod are each fixed with an eccentric wheel, and each telescopic plate is provided with an oblong hole for matching with the eccentric wheel;
    the telescopic drive is connected to the connecting rod so as to drive the connecting rod to rotate; and
    the longitudinally movable walking device is connected to the telescopic plate.

2. The goods shelf shuttle according to claim 1, wherein the lifting device comprises a lifting drive and a connecting member, the lifting drive is connected to the vehicle body, and a first end of the connecting member is connected to an output end of the lifting drive, a second end of the connecting member is connected to the fixed part, and the lifting drive is configured to drive the connecting member to move so as to vary a distance between the first end and the second end in a vertical direction.

3. The goods shelf shuttle according to claim 2, wherein the lifting device further comprises: a transmission rod rotatably connected to the vehicle body; the connecting member comprises a plurality of flexible lifting belts wound on the transmission rod, one ends of the flexible lifting belts are fixed on the transmission rod, and the other ends of the flexible lifting belts are fixedly connected with the fixed part;
    the output end of the lifting drive is connected with the transmission rod to drive the transmission rod to rotate, thereby changing a distance between the other end of the flexible lifting belt and the transmission rod.

4. The goods shelf shuttle according to claim 3, wherein the vehicle body is further provided with a plurality of rollers arranged according to a preset rule, and the other end of each flexible lifting belt passes around one roller and is then fixedly connected to the fixed part.

5. The goods shelf shuttle according to claim 4, wherein a portion of the flexible lifting belt between the roller and the fixed part extends in a vertical direction.

6. The goods shelf shuttle according to claim 4, wherein the number of the flexible lifting belts is 4, two ends of the transmission rod are each connected with two flexible lifting belts, and the fixed part has a quadrilateral cross section, and the four flexible lifting belts are symmetrically fixed around the fixed part.

7. The goods shelf shuttle according to claim 1, wherein the goods shelf shuttle comprises laterally movable walking device, and the laterally movable walking device is connected to the vehicle body and is configured to drive the vehicle body to move along a lateral direction.

8. The goods shelf shuttle according to claim 7, wherein the first laterally movable walking device comprises: a first drive assembly and a plurality of first walking wheels arranged in an array on the vehicle body, axle of each first walking wheel extends in a longitudinal direction;
    the first drive assembly comprises a first drive connected to the vehicle body and a first rotation shaft extending in a longitudinal direction, both ends of the first rotation shaft are each fixed with two first walking wheels, the first rotation shaft is rotatably connected to the vehicle body; an output end of the first drive is connected to the first rotation shaft so as to drive the first rotation shaft to rotate.

9. The goods shelf shuttle according to claim 1, wherein, the telescopic plate comprises two telescopic arms, top ends of the two telescopic arms are connected, bottom ends of the two telescopic arms extend obliquely downward, so that there is a preset angle between the two telescopic arms, the top ends of the telescopic arms may be provided with the oblong hole, and the longitudinally movable walking device is provided at the bottom end of the telescopic arm.

10. The goods shelf shuttle according to claim 1, wherein the longitudinally movable walking device comprises: a second drive assembly and a plurality of second walking wheels arranged symmetrically on the two telescopic plates, an axle of each second walking wheel extends in the lateral direction;
    the second drive assembly comprises a second drive arranged on the telescopic plate, a second rotation shaft extending along the lateral direction, and two transmission assemblies respectively arranged at both ends of the second rotation shaft; both ends of the second rotation shaft are rotatably connected to the two telescopic plates, one end of each transmission assembly away from the second rotation shaft is connected to one second walking wheel; and an output end of the second drive is connected to the second rotation shaft so as to drive the second rotation shaft to rotate.

11. The goods shelf shuttle according to claim 1, wherein the fixed part comprises a bottom plate and two side plates each arranged on the bottom plate; the side plates are connected with the lifting device;

each side plate is connected to a first telescopic plate that is slidably arranged on the side plate in a longitudinal direction; the first telescopic plate is further provided with a second telescopic plate that is slidably arranged on the first telescopic plate in the longitudinal direction, two ends of the second telescopic plate are each provided with the mobile part; the mobile part is capable of following the first telescopic plate and the second telescopic plate to move longitudinally relative to the fixed part; and the mobile part is also capable of rotating relative to the second telescopic plate so as to protrude inward from the second telescopic plate.

12. The goods shelf shuttle according to claim 11, wherein the fixed part is further provided with an access drive assembly; the access drive assembly is configured to drive the first telescopic plate to slide relative to the side plate, and drive the second telescopic plate to slide relative to the first telescopic plate.

13. The goods shelf shuttle according to claim 12, wherein the access drive assembly comprises: an access drive and a first access transmission assembly connected between the access drive and the first telescopic plate;

the first access transmission assembly comprises: a plurality of belt wheels and a toothed belt winding the plurality of belt wheels; the toothed belt comprises a first section extending along the longitudinal direction; and a plurality of first teeth arranged at intervals along the longitudinal direction are formed on the first section; a plurality of second teeth arranged at intervals along the longitudinal direction are formed on a bottom surface of the first telescopic plate; the first teeth matches with the second teeth;

an output end of the access drive is connected with one belt wheel so as to drive the belt wheel to rotate, the first telescopic plate slides relative to the side plate.

14. The goods shelf shuttle according to claim 13, wherein the access drive assembly further comprises: a second access transmission assembly connected with the first telescopic plate and the second telescopic plate;

the second access transmission assembly comprises: two pulleys arranged at two ends of the first telescopic plate and two belts respectively winding the two pulleys; axes of the pulleys extend along the vertical direction, one end of the belt is fixed on the side plate, the other end of the belt is fixed on the second telescopic plate after passing around the pulley, winding directions of the two belts on corresponding pulleys are opposite.

15. The goods shelf shuttle according to claim 1, wherein the fixed part is further provided with a supporting device;

the supporting device comprises a supporting drive assembly and a plurality of engaging parts connected with the supporting drive assembly; the supporting drive assembly is configured to drive the engaging part to move relative to the fixed part in a direction parallel to extension and retraction of the mobile part, so that the engaging part engages with an engagement slot on a shelf.

16. The goods shelf shuttle according to claim 15, wherein the supporting drive assembly comprises a supporting drive and a supporting transmission assembly;

the supporting transmission assembly comprises a gear fixedly connected to an output end of the supporting drive; a sector gear and a first connecting rod matched with the gear; and two second connecting rods respectively hinged to both ends of the first connecting rod; the sector gear is fixed at middle of the first connecting rod; one end of each second connecting rod away from the first connecting rod is hinged to the engaging part; the fixed part is provided with a sliding rail, and the engaging part is slidably arranged on the sliding rail.

17. A goods shelf system, comprising a plurality of shelves arranged in an array, tracks arranged on tops of the shelves, and the goods shelf shuttle according to claim 1, a vehicle body of the goods shelf shuttle is capable of travelling on the tracks.

* * * * *